UNITED STATES PATENT OFFICE.

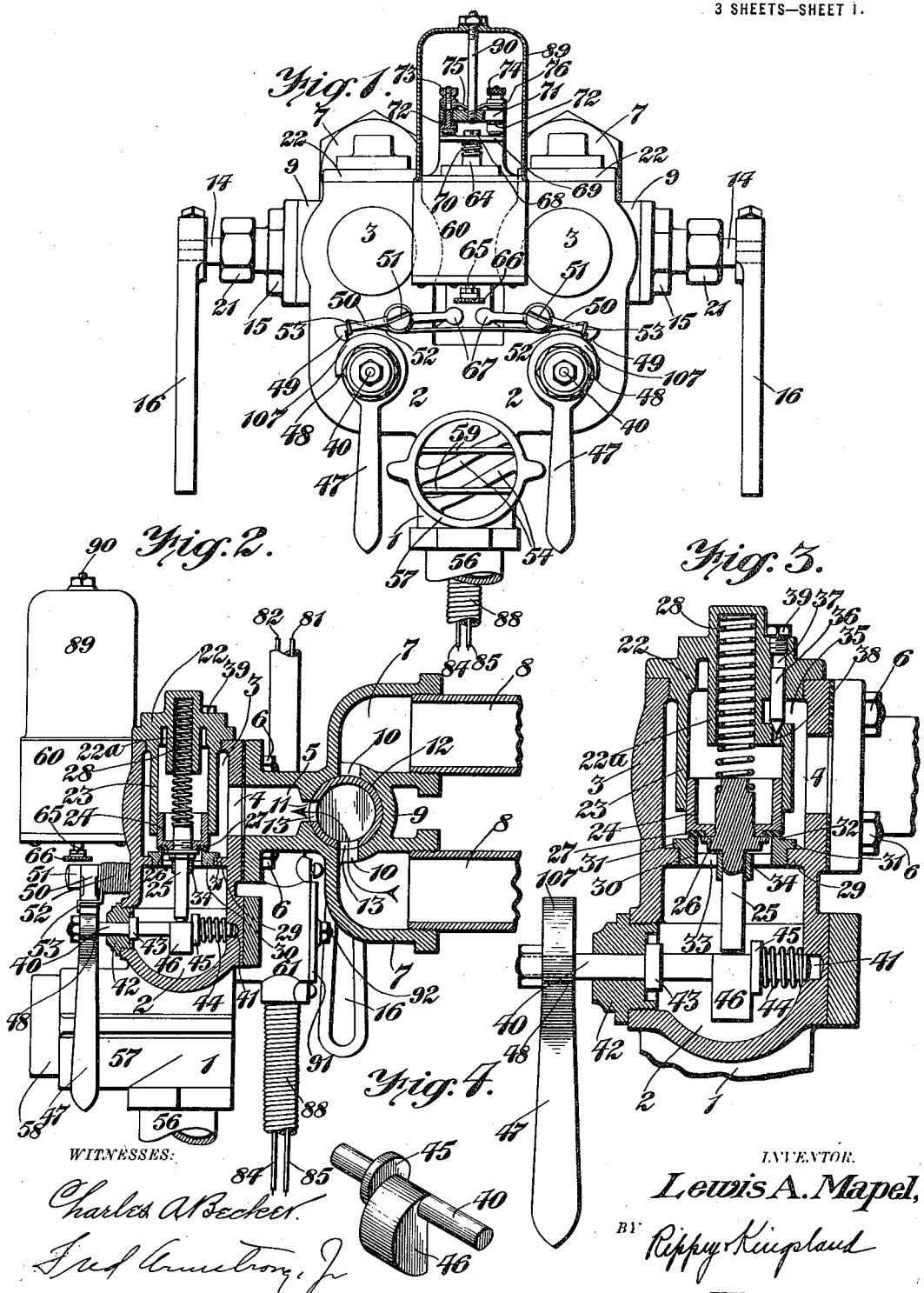

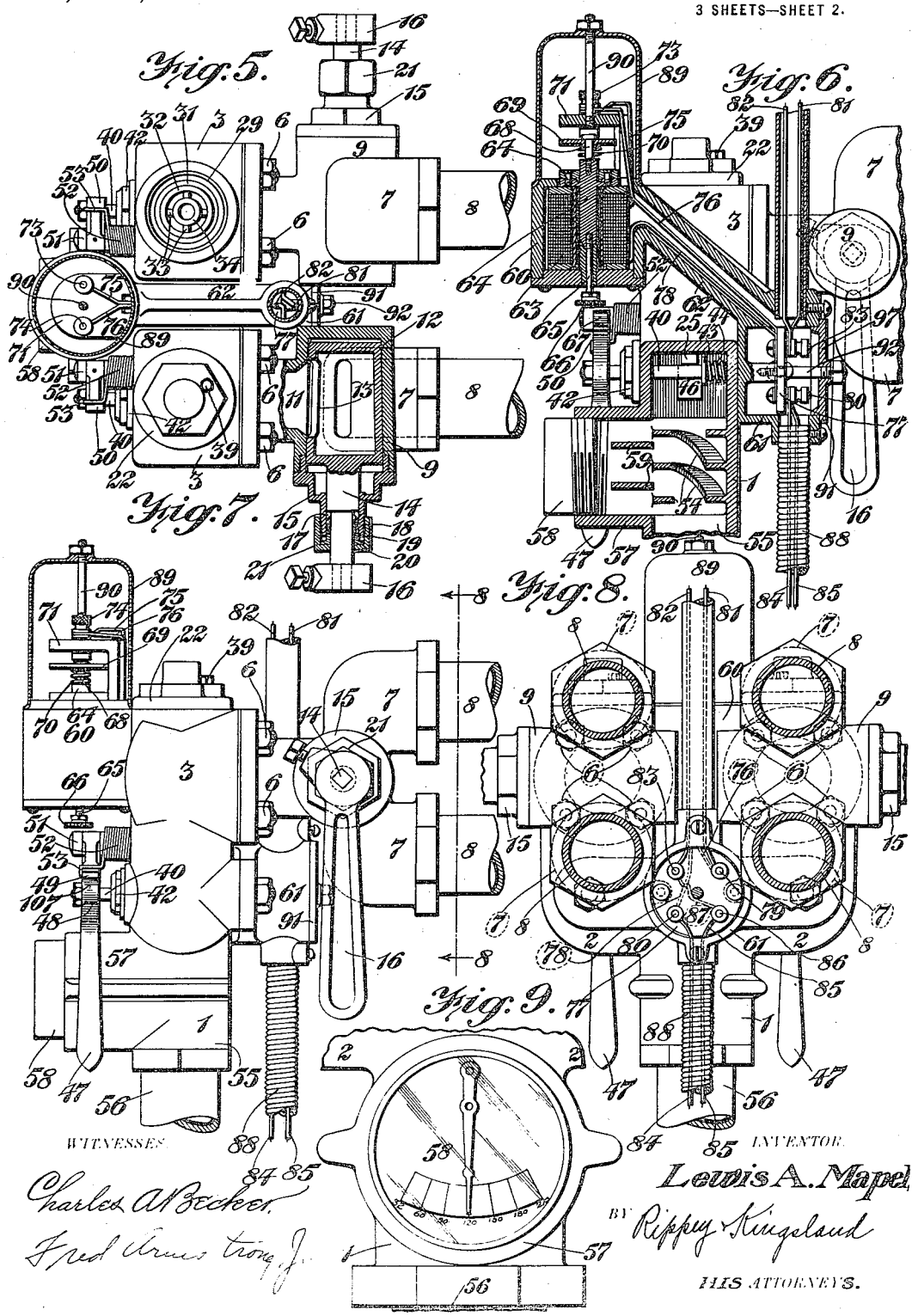

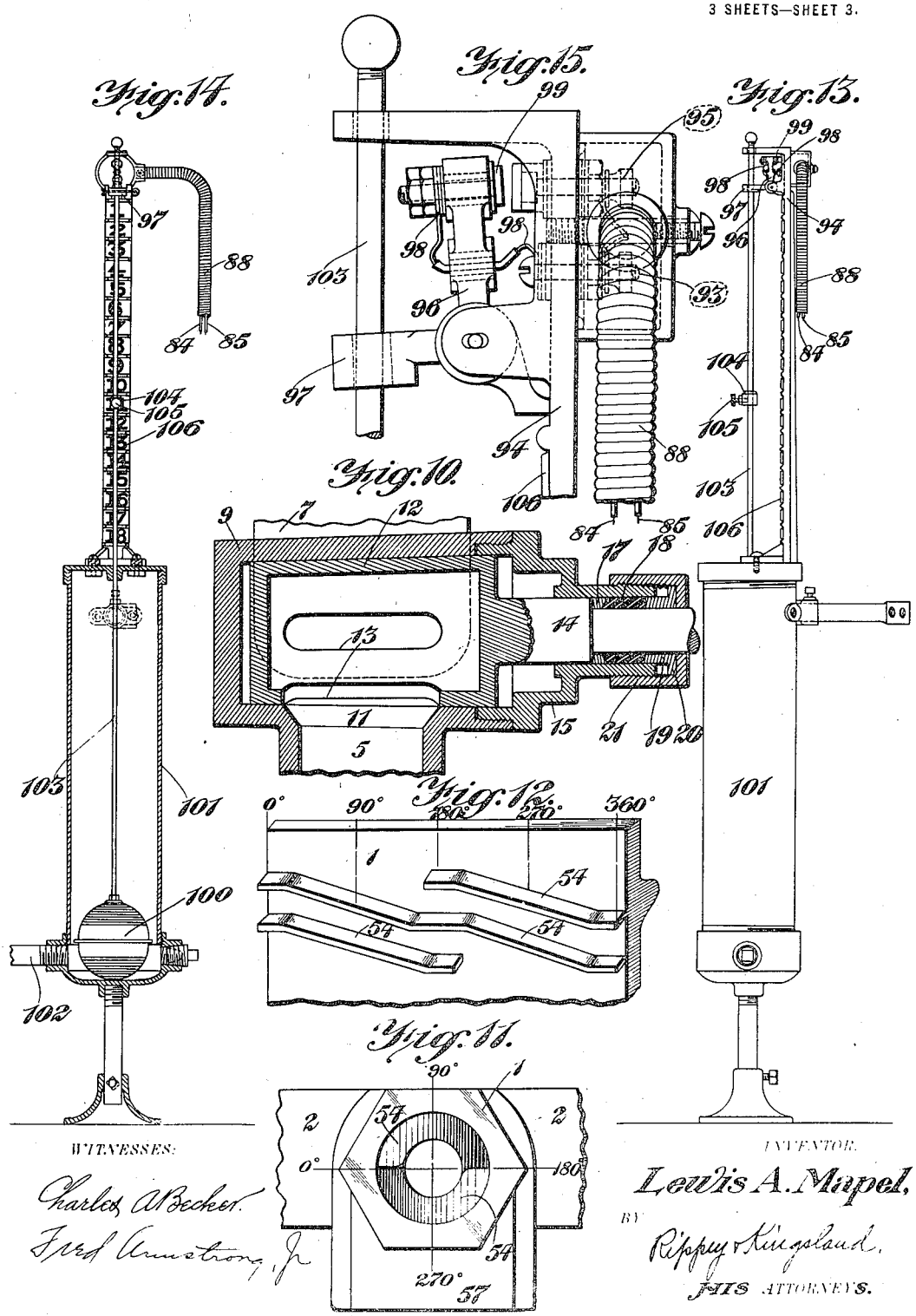

LEWIS A. MAPEL, OF ST. LOUIS, MISSOURI, ASSIGNOR TO MAPEL MANUFACTURING COMPANY, OF ST. LOUIS, MISSOURI, A CORPORATION OF MISSOURI.

FLUID-REGULATING DEVICE.

1,179,539.   Specification of Letters Patent.   Patented Apr. 18, 1916.

Application filed April 16, 1915. Serial No. 21,815.

*To all whom it may concern:*

Be it known that I, LEWIS A. MAPEL, a citizen of the United States, and residing in the city of St. Louis and State of Missouri, have invented a new and useful Fluid-Regulating Device, of which the following is a specification.

This invention relates to fluid regulating devices, and has particular reference to that class of said devices which are adapted to be placed in fluid supply systems and which are equipped with adjustable valves whereby fluids may be admitted in varying quantities and of selected qualities, provision also being made for the thorough mixing of the fluids of different qualities, and for closing the device when a predetermined quantity of fluids have passed to the point of delivery.

An object of the invention is to provide an improved device of the character mentioned comprising a mixing chamber into which the selected fluids are to be delivered, devices within said chamber whereby the fluids of different qualities or kinds admitted thereto simultaneously from different sources of supply will be thoroughly and uniformly mixed or combined, in combination with a number of passages for delivering the fluids into said chamber, and optionally operable means controlling the admission of different qualities of fluid into each of said passages, so that the operator may at his option change the quality of the ultimate mixture by changing the quality of the fluid delivered through either of said passages into the mixing chamber.

Another object is to provide a device of the character mentioned which includes a device located between the mixing chamber and the admission valve of each passage for controlling the liquid and settable in one position to permit the liquid to pass from the admission chamber into the mixing chamber, and automatically operated to another position to prevent the admission of the liquid into the mixing chamber, in combination with mechanism and appliances for effecting the proper operation of said device.

Another object of the invention is to provide an improved device of the character mentioned, comprising a mixing chamber into which a number of liquid supply passages open, a number of shelves extending into a lateral extending portion of said chamber whereby the liquid is directed into contact with the case of a thermometer, and means for optionally and automatically controlling and regulating the supply of the liquid through said several passages.

Various other objects both of a general and specific nature will appear from the following description, reference being made to the accompanying drawings wherein I have illustrated a preferred embodiment of the invention, and in which—

Figure 1 is a side elevation of a fluid regulating device embodying my present invention. Fig. 2 is a sectional view illustrating the valve controlling the passage of the fluid from any of the supply passages into the passage and chamber leading to the mixing chamber, and also illustrating the device intermediate of said valve and the mixing chamber for controlling the admission of the fluid into the mixing chamber. Fig. 3 is a view enlarged with respect to Fig. 2 illustrating additional features of the device controlling the admission of the fluid to the mixing chamber. Fig. 4 is a perspective view of the cam for actuating and holding in one position the device controlling the admission of the fluid to the mixing chamber. Fig. 5 is a combined plan and sectional view of a complete fluid regulating device constructed to receive in the mixing chamber thereof fluids of different qualities from different sources of supply simultaneously, the supply of the fluid from the several sources being independently controlled. Fig. 6 is a vertical section view illustrating certain of the features of the mixing chamber and certain of the mechanism for controlling the automatic devices which controls the admission of the fluid into the mixing chamber. Fig. 7 is a side elevation, a portion of the magnet casing being in section. Fig. 8 is a view substantially on the line 8—8 of Fig. 7. Fig. 9 is a detail view illustrating the thermometer which closes one side of the mixing chamber and which indicates the temperature of the mixed liquids. Fig. 10 is a sectional view further illustrating the construction of the valve and its accessories, which control the different supply passages. Fig. 11 is a view looking into the end of the mixing chamber illustrating the spiral vanes therein. Fig. 12 is a diagrammatic view illustrating the vanes of the mixing chamber in projection or diagrammatically arranged. Fig. 13 is a side elevation of the mechanism which automatically controls the admission of the fluid into the mixing chamber in conformity with any desired pre-arrangement. Fig. 14 is a view further illustrating the mechanism illustrated in Fig. 13. Fig. 15 is an enlarged detail view of a portion of said mechanism.

In the particular embodiment in which I have illustrated my invention there is a casing which contains a single mixing chamber arranged to receive fluids from a number of passages. In the form shown the mixing chamber 1 is in communication with two passages 2, said passages constitute continuing portions of the receiving passages or chambers 3. A passage 4 opens into each of the receiving passages or chambers 3, said passages 4 being in communication with the passages 5 formed in members which are supported in connection with the principal housing by releasable fastening devices 6. The members containing the passages 5 are formed with a number of receiving passages 7 adapted to receive fluids from different sources, and of different kinds or qualities if desired, through the supply pipes 8.

A valve casing 9 is interposed between the passage 5 and the two passages 7 in each member, and there are openings 10 for admitting the fluid from the passages 7 into the valve casing 9, there being a single opening 11 for delivering the fluid from the valve casing into the passage 5 in each member. Within each of the valve casings 9 a revoluble hollow valve body 12 is mounted, said valve body being provided with two openings 13 formed and arranged so that when one of said openings communicates with one of the openings 10 the other opening 13 may be in communication with the opening 11, while the wall of the valve closes the opening 10 which is not in communication with either of said openings 13 in the valve. This arrangement is clearly illustrated in Fig. 2 in which the valve is positioned so as to admit the fluid from the lower supply passage through the valve into the passage 5 and thence into the chamber 3 from which the fluid passes to the mixing chamber as before explained. By reference to Fig. 2 it will be understood that the valve 12 may be positioned so as to admit fluid from either of the supply passages 7 to the exclusion of the other; or said valve may be positioned so as to exclude the fluid from both of said passages 7 and thus prevent any fluid from entering the chamber 3. The structure of the valve 12 is the same in both of the members containing the supply passages, so that in describing one of the valves it will be understood that the description applies equally as well to the other. The stem 14 of the valve 12 includes a portion having bearing within the stuffing box 15, and a reduced portion which extends outwardly and supports the operating lever 16. The stuffing box 15 has releasable threaded engagement with the valve casing 9, and is thereby retained rigidly in proper adjustment. A ring or gland 17 is seated against a shoulder on the valve stem 14 within the stuffing box and encircles the reduced portion of the valve stem. Said ring or gland 17 is free to revolve with respect to the valve stem and the stuffing box and constitutes a movable abutment for the packing which is within the stuffing box. The outer face of the ring or gland 17 (Fig. 10) is dished or obliquely disposed, so that there is an annular V-shaped groove between the wall of the ring or gland 17 and the periphery of the reduced portion of the valve stem. The packing 18 is compressed within the stuffing box around the reduced portion of the valve stem and against the oblique surface of the ring or gland 17. The devices for compressing and compacting the packing comprise a collar 19 which encircles the reduced portion of the valve stem and extends a distance within the stuffing box and against the packing, so that by forcing the collar 19 against the packing the latter will be pressed and compacted within the stuffing box and against the ring or gland 17. The outer extremity of the collar 19 is preferably provided with a circumferential flange 20 which fits within the cap 21 bearing against the end of said cap. The cap 21 is interiorly threaded, the threads thereof engaging the exterior threads on the stuffing box, so that by the operation of securing the cap 21 on the stuffing box the collar 19 is forced against the packing so as to compress the latter to the desired extent. It will be understood that by the arrangement just described the ring or gland 17 prevents fouling of the packing as a result of any operations of the valve. The packing being thus compressed imparts pressure to maintain the valve in proper adjustment in the valve case without the necessity of any accessory retaining devices ordinarily employed, prevents leakage when the valve is subjected to improper treatment, and also constitutes a seal around the valve stem to prevent leakage at that point. The provision of the members 17 and 19 also minimize the resistance to the operation of the valve due to the compression of the packing within the stuffing box and around the valve stem.

From the foregoing it will be understood that several different kinds and qualities of fluid may be selectively admitted into the mixing chamber by manipulation and adjustment of the valves 12 whereby fluid may be admitted from any of the pipes 8 to the exclusion of the others. For instance, chemically treated fluid, such as chemically treated water, may be admitted from one of the pipes through one of the valves 12 and delivered into the mixing chamber to be mixed with a different kind or quality of fluid admitted through the other valve 12. Also cold water may be admitted through one of the valves and mixed with hot water admitted through the other valve, so as to provide a mixture of the desired temperature. The valves 12 may be independently manipulated and will remain in any adjustment in which they may be placed.

Referring next to the devices intermediate of the valve 12 and the mixing chamber for controlling the admission of the liquids into the mixing chamber, it is appropriate to mention that I provide a device of this character between each valve 12 and the mixing chamber. The upper end of each chamber 3 is provided with a threaded opening in which is screwed a member 22 having a tubular portion 23 extending into the chamber 3 and constituting a guide for a vertically movable gravity actuated puppet valve device 24 which is operatively located within the inner end of said extension 23. In the particular embodiment shown the valve device 24 is tubular in form, and has an end wall provided with a threaded hole which receives the threaded portion of an actuating valve stem 25. The valve stem 25 is formed with a flange 26 abutting and fitting closely against the lower surface of the end wall of the member 24, said flange being preferably provided with a polygonal portion for engagement with a wrench or tool by which the valve stem may be secured in position or removed. An annular packing 27 is secured to the end of the valve member 24 and is removable for the purpose of being renewed. The member 22 is provided with a tubular portion 22$^a$ which constitutes a seat for a coiled spring 28 of the expansion type, the outer end of said spring having bearing against the end of the member 22 and the inner end of said spring encircling a portion of the stem 25 and abutting against an annular shoulder on said stem, thereby actuating the valve member 24 to its position upon the valve seat.

The chamber 3 is provided with an internal flange 29 (Figs. 2 and 3), which is screwed interiorly threaded and into which is screwed a valve seat 30, the latter being provided with a circumferential flange 31 bearing against the upper surface of the flange 29. Above the flange 31 there is a raised portion 32 which constitutes the valve seat proper, and upon which the packing 27 of the valve member 24 seats when said valve member is in position to prevent the admission of fluid into the mixing chamber. A series of radial arms 33 which are integral with the inner lower portion of the member 30 support a bearing collar 34 through which the lower reduced portion of the valve stem 25 extends, said collar constituting a guide which positively retains the movable parts in their proper adjustments and prevents dislocation of any of said parts when operated. One side of the tubular extension 23 is provided with a recess 35 (Fig. 3), and a sliding pointed valve 36 is supported within a hole 37 in the member 22 and extends across the recess 35 and into the passage 38 between said recess 35 and the interior of the extension 23. The outer end of the hole 37 is closed by a removable screw plug 39 which also constitutes an abutment for limiting movement of the member 36. From the foregoing it will be understod that when the valve 12 is open to admit fluid from either of the pipes 8, and when the valve member 24 is raised the air will be forced from within the tubular chamber 23, the valve 36 rising to permit escape of the air through the passage 38. Should any portion of the fluid enter through the passage 38 the action of the fluid in subsequent operations of the device will be the same as the action of the air. The fluid being forced out of the chamber 23 by the raising of the valve member 24 permits free operation of said valve. The effect of the fluid being thus admitted into the chamber 23 above the valve 24 is to prevent vibration of the valve in any of its positions, so that when said valve is raised to permit the liquid to pass into the mixing chamber through the valve support 30, said valve will not be vibrated under any circumstances, even under varying pressures of the flowing liquid. This is an important feature of the particular mechanism now being described, because without some means for preventing the percussive vibration of the valve said valve would be forcibly vibrated by the flowing liquid, due to the varying pressures thereof or to other causes.

A rod 40 extends across each of the chambers 3 below the corresponding valve stem 25. The inner end of the rod 40 in each instance has bearing in a recess 41 formed in the wall of said chamber, and the outer end of said rod is revoluble within a bearing in a plug 42 screwed into a threaded hole in the wall of the chamber 2. A collar 43 on the rod 40 is provided with a ground surface which abuts against the inner ground surface of the plug 42 to prevent outward movement of said rod and to constitute a seal to prevent leakage through the bearing. Said rod is capable of inward movement because of the fact that the end of said rod does not extend to the full depth of the bore 41. A spring 44 of the expansion type encircles the inner portion of the rod 40, and one end of said spring bearing against the inner wall of the chamber 3, and the opposite end of the spring bearing against a flange or collar 45 on the rod. A cam 46 is attached to the rod 40 immediately below the lower end of the valve stem 25, so that in one position of said cam the rod 25 is permitted sufficient downward movement for the packing 27 of the valve 24 to bear upon the valve seat and thus close communication between the supply passages and the lower portion of the chamber. The cam 46 thereon engages the lower end of the stem 25 and thereby raises the valve member 24 in opposition to the power of the spring 28, thus opening the passage and enabling the fluid from the supply passages to flow into the lower end of the chamber 3 and thence into the mixing chamber. For such manipulation of the rods 40 each of said rods is provided with a handle or lever 47. It is apparent, however, that the pressure of the stem 25 against the surface of the cam 46 by the spring 28 requires the provision of means for positively holding the rod 40 in position to resist the pressure of said spring 28 in order to prevent said spring from restoring the valve member 24 to its closed position. For the purpose of holding each of the rods 40 in position to hold the valves 24 open against the pressure of the springs 28 each of the levers 47 is provided with a shoulder 48 (Fig. 1), adapted to be engaged by the hooks 49 on the ends of the spring-actuated lever 50. The levers 50 are pivotally mounted on supports 51 which also support springs 52 having their ends 53 engaging with the levers 50 effectively to hold the hooks 49 in engagement with the shoulders 48 when the rod 40 is adjusted to hold the valve members in open position. Thus, the levers 50 constitute releasable latch devices for holding the valves 24 open so as to permit continuous flow of the liquid from the chambers 3 into the mixing chamber. My invention also includes automatic means for releasing the levers 50 under predetermined conditions as, for instance, when the required amount of fluid has been delivered into the receptacle or tank which receives it. Before describing said automatic mechanism, however, I will complete the description of the mixing chamber and its accessories. As before stated each of the chambers 3 has communication with the mixing chamber 1 through a passage 2, so that the fluid admitted from the different sources of supply is required to pass together into the mixing chamber in which the fluids become thoroughly and uniformly commingled to form the desired mixture of a substantially uniform quality throughout. The wall of the mixing chamber supports a number of spiral vanes or flanges 54, there being two of such vanes in the embodiment illustrated. The vanes or flanges 54 are spirally arranged and extend from near the upper end of the mixing chamber to points adjacent the outlet therefrom. The fluids which are admitted from the oppositely disposed passages to form a confluence at the entrance to the mixing chamber within which the fluids are thoroughly and uniformly mixed by the vanes 54. The lower end of the mixing chamber is provided with an outlet 55 through which the mixture is discharged into a pipe 56 leading to the tank or container which receives the mixture. The mixing chamber is provided with a lateral extension 57 in the open end of which is a thermometer 58 arranged so that the fluid will flow into contact therewith, thus affording at all times a visual indication of the temperature of the mixture. The temperature of the mixture may be varied by manipulation of the valves 12 so as to vary the quantity of fluid passing through either of said valves. Within the lateral extension 57 of the mixing chamber a number of shelves 59 are arranged so as to receive and further assist in the mixing of the fluids, thus coöperating with the spiral vanes 54 for such purpose.

Thus far the device constitutes a complete mechanism capable of manual control. However, it is preferable that the device be equipped with automatic mechanism whereby the flow of the fluid may be terminated under predetermined conditions. As previously mentioned I have provided such automatic mechanism and, in the present embodiment of the invention, said automatic mechanism is arranged to coöperate with the levers 50 so as to release them from their engagement with the shoulders 48 and thus permit the valves 24 to close when the desired quantity of liquid has passed through the device. It is appropriate at this point to describe such automatic mechanism.

In the present embodiment the automatic mechanism for releasing the levers 50 is of the electric type. Many of the parts of such mechanism which are directly associated with the mixing device are carried in a support which comprises a magnet case 60, a case 61 (Fig. 6) for the electric terminals, and a conduit 62 between said cases and adapted to contain the wires passing from the terminals to the magnet. The magnet 63 is within the case 60 and is provided with a hollow core within which the armature 64 operates. The armature 64 has a small rod 65 connected to the lower end thereof and extending through an opening in the lower end of the magnet case and supporting an actuating member 66 on its lower end. The actuating member 66 is preferably adjusted by threaded engagement with the end of the rod 65 and is provided with a flat lower wall adapted to contact with rounded portions 67 on the ends of the levers 50. By this arrangement it will be understood that when the magnet 63 is energized so as to lower the armature 64, the latter will cause the actuating member 66 to depress the adjacent ends of the levers 50 and thus disengage the hooks 49 from the shoulders 48. When the hooks 49 are thus disengaged from the shoulders 48 the rods 40 are free to turn so that the pressure of the springs 28 forces the valves 24 upon the valve seats 32 and thus close the passages from the receiving portions of the chambers 3 to the mixing chamber.

The armature 64 has a stud 68 releasably connected to the upper end thereof, and a plate 69 is movably mounted on said stud and prevented from becoming detached by the head of the stud. An expansion coil spring 70 encircles the stud 68 between the upper end of the armature and the plate 69, and actuates said plate upwardly. A plate 71 is integral with the casing 60 above the magnet and extends above the plate 69 and is provided with a hole having a lining of insulation as shown at 72 in Fig. 1. The plate 71 supports a binding post 73 which extends through the insulation 72 and contacts with the plate 69. A second binding post 74 is similarly supported by the plate 71 and is in circuit with the plate 69. A wire 75 from the magnet coil leads to the binding post 73, and a wire 76 leads from the post 74 to a connection on an insulation support 77 within the case 61. A second wire 78 leads from the magnet coil through the passage 62 to another connection on the support 77. The wire 76 is connected to the binding post 79 on the support 77, and the wire 78 is connected to the binding post 80 on said support. The post 79 is connected with a circuit wire 81, while the other circuit wire 82 is connected to another post 83 on said support 77 (Figs. 6 and 8), but said posts 79 and 83 can only be placed in circuit with each other by the switch mechanism controlled by the supply of fluid delivered through the regulating device. A wire 84 is connected to the post 80 to which the wire 78 from the magnet is also connected, and another wire 85 is connected to a post 86 from which a connection 87 leads to the post 83. The wires 84 and 85 extend through a flexible tube 88 to the switch which is controlled by the fluid actuated device.

The mechanism supported by the case 60 above the magnet is protected by an inclosure 89 retained in place by a rod 90 connected to the top of said inclosure and screwed into a hole in the plate 71. The case 61 is closed by a plate 91 releasably held by a rod 92. The wire 84 passing through the flexible tube 88 leads to a post 93 (Fig. 15), secured to a support 94, while the wire 85 extends through the flexible tube 88 to a post 95 on said support. The member 94 pivotally supports a switch device 96 having a weighted arm 97 which holds said switch member in position to maintain the upper end thereof out of contact with the end of the post 95, thus keeping the circuit open. A wire 98 leads from the post 93 to the contacting member 99 on said switch member 96, said member 99 being adapted to be moved into and out of engagement with the adjacent terminal of the wire 85 which leads to the post 95.

In the position illustrated in Fig. 15 the switch is open, and the magnet 63 is not energized because the circuit is incomplete, but if the switch member 96 be operated to place the contacting element 99 into contact with the terminal of the wire 85 the circuit will be completed and the magnet energized thereby actuating the armature 64 downwardly to the position illustrated in Fig. 6 and causing the element 66 to depress the adjacent ends of the levers 50 and thereby disengage the hooks 49 from the shoulders 48. When the hooks 49 are disengaged the springs 28 close the valves 24, as previously explained. The operation of the switch member 96 is automatically effected by a float device under control of the fluid after the fluid has passed through the fluid regulating device. The float 100 (Fig. 14) is within a cylinder 101 which receives a part of the liquid through a pipe 102. A rod 103 connected to the float 100 extends through the top of the cylinder 101 and also through a hole in the weighted arm 97 of the switch member 96 and through a hole in an extension of the bracket 94, being thus properly guided. An abutment 104 is adjustably mounted on the rod 103 and is provided with a set screw 105 whereby it may be securely held in any adjustment in which it may be placed on said rod. Obviously when the fluid enters the cylinder 101 and the float 100 is raised the abutment 104 will eventually engage the arm 97 and move the contacting member 99 into contact with the wire terminal from the post 95 and thus complete the circuit and cause the magnet 63 to be energized. This action occurs when the predetermined quantity of liquid has been discharged from the regulating device, and the parts may be adjusted so that any desired quantity of the liquid may pass through the regulating device before the switch will be closed. By adjusting the abutment 104 toward the upper or lower end of the rod 103 such variations may be effected. Preferably the support 94 is provided with a scale 106 adjacent to the rod 103 as a guide so that the abutment may be accurately adjusted in order that the switch will be closed after the desired quantity of fluid has passed through the regulating device.

From the foregoing it will be understood that the purpose of the mechanism under control of the fluid, for energizing the magnet 63, is to release the rods 40 so as to enable the valves 24 to be closed by their springs 28. The closing of the valves 24 is effected promptly following the completion of the circuit by the fluid control mechanism, so that there is no necessity for the magnet to remain energized. For the purpose of preventing continuing energizing of the magnet I provide means operating as an incident to the closing of the valve 24, for breaking the circuit through the magnet. In the particular embodiment illustrated the means for breaking the circuit to the magnet comprises devices under control of the valves 24, though it will be apparent that such devices may be otherwise controlled. In the form shown the hubs of the levers 47 (Fig. 1) are in the form of cams 107, so that when the hooks 49 are released from the shoulders 48 the cams 107 will engage the ends of the hooks 48 and raise them as said cams turn with the rod 40 to which they are secured. The cams 107 depress the inner ends of the levers 50 out of contact with the member 66, so that the armature 64 moves down by gravity until it contacts with an abutment member supported by the magnet case. When so positioned the plate 69 is out of contact with the contact points on the posts 73 and 74, thereby breaking the circuit so that it is immaterial if the switch 96 remains closed. Thus there is mechanism under control of the fluid which has passed through the device for closing the device to prevent further passage of the fluid therethrough; and there are devices under control of the device itself for disabling said mechanism, the ability of said mechanism to act being renewed as an incident to the resetting of the regulating device to permit the fluid to pass therethrough.

It is apparent that many of the advantageous features of my invention may be used in other embodiments and combinations with equal advantage and that the structure of the combined elements of the device may be varied without departure from the scope of the invention. Although I have illustrated the valve 12 adapted and arranged to coöperate with and control a plurality of supply passages so as to be selectively operative to deliver fluid from either of said passages into a receiving passage common to all of the supply passages, it will be understood that I do not restrict myself to the use of the valve 12 in such specific arrangement. Obviously said valve may be mounted so as to control a different number of supply passages, and the improved valve mounting, comprising the valve casing, the stuffing box, and their accessories, may be advantageously used in numerous different embodiments and machines.

Various other alterations and modifications may be resorted to in the construction and operation of the device without departure from the principles and scope of the invention.

I do not restrict myself to specific features but contemplate the use of equivalent elements and operations wherever they may be advantageously employed.

What I claim and desire to secure by Letters Patent of the United States is:

1. A fluid regulating device comprising series of supply passages, a receiving passage for receiving the liquid from each series of supply passages, a single mixing chamber for receiving and mixing the fluids passing from said receiving passages, devices for selectively admitting fluid into said receiving passages from selected ones of said supply passages in each series, and a valve in each of said receiving passages controlling the flow of fluid from said receiving passages into said mixing chamber.

2. A fluid regulating device comprising a casing, two receiving passages in said casing, a series of supply passages communicating with each of said receiving passages, a valve for each series of supply passages for selectively admitting fluid therefrom into said receiving passages, a mixing chamber within said casing, and independently settable valves in said receiving passages for controlling the flow of fluid therefrom into said mixing chamber.

3. A fluid regulating device comprising a casing, two receiving passages in said casing, a series of supply passages communicating with each of said receiving passages, devices for selectively admitting fluid into said receiving passages from selected ones of said supply passages in each series, a mixing chamber into which both of said receiving passages open, a valve in each of said receiving passages controlling the flow of fluid therefrom into said mixing chamber, and elements for holding said valve open.

4. A fluid regulating device comprising a casing, a number of receiving passages in said casing, supply passages communicating with each of said receiving passages, valves controlling the admission of fluid selectively from said supply passages into said receiving passages, a mixing chamber into which all of said receiving passages open, a valve in each of said receiving passages controlling the flow of fluid therefrom into said mixing chamber, and releasable means for holding said valves in position to admit fluid into said mixing chamber.

5. In a fluid regulating device, a casing, supply passages for delivering fluids into said casing, a revoluble valve adjustable to admit fluid selectively from different ones of said passages, an additional valve adjustable to admit fluid from others of said supply passages, a mixing chamber in said casing arranged to receive the fluid admitted from said supply passages, valves intermediate said mixing chamber and said first-named valves, means for holding said intermediate valves open to permit the fluids to enter said mixing chamber, and automatic means for closing said intermediate valves when a predetermined quantity of fluid has passed through said mixing chamber.

6. In a fluid regulating device, an integral casting having a number of receiving passages formed therein, supply passages for admitting fluid into said receiving passages, independently operable means for admitting fluid from a number of said passages at the same time, a mixing chamber arranged to receive the fluids from said receiving passages, means within said mixing chamber for causing the mixture of the fluids flowing therethrough, independently operable valves within said receiving passages controlling the admission of fluids into said mixing chamber, releasable latch devices for holding said valves open, and automatic mechanism for releasing said latch devices and closing said valves simultaneously after a predetermined quantity of fluid has passed through said mixing chamber.

7. In a fluid regulating device, a casing, a mixing chamber in said casing, elements in said mixing chamber for causing mixture of the fluids passing through said chamber, series of supply passages for admitting fluids into said casing, a valve for each series of supply passages settable in different positions to admit fluids into said casing selectively from said supply passages, additional valves in said casing for controlling the flow of fluids into said mixing chamber, and means under control of the fluids that have passed through said mixing chamber for closing said additional valves after a predetermined quantity of fluids have passed through said chamber.

8. In a fluid regulating device, a casing, a mixing chamber in said casing, means in said chamber for mixing the fluids flowing therethrough, a plurality of passages opening into said mixing chamber, a valve controlling the admission of fluid into each of said passages, an additional valve in said casing in each of said passages controlling the flow of fluid into said mixing chamber, latch elements for holding said additional valves open, automatic means under control of the fluid that has passed through said mixing chamber for releasing said latch elements when a predetermined quantity of fluid has passed through said chamber, and means in addition to said automatic means for closing said additional valves when said latch elements are released by said automatic means, as aforesaid.

9. In a fluid regulating device, a casing, a mixing chamber in said casing, a number of receiving chambers in said casing, a passage from each of said receiving chambers to said mixing chamber, means for selectively admitting fluid from different sources of supply into each of said receiving chambers, and valves controlling the flow of the fluid from said receiving chambers into said mixing chamber.

10. In a fluid regulating device, a casing, a mixing chamber in said casing, a number of receiving chambers in said casing, a number of supply passages for supplying fluid to each of said receiving chambers, a valve for each of said receiving chambers for selectively admitting fluid from said supply passages, and valves intermediate of said first-named valves and said mixing chamber controlling the flow of the fluid into said mixing chamber.

11. In a fluid regulating device, a casing, a mixing chamber in said casing, a number of receiving chambers in said casing, a number of supply passages communicating with each of said receiving chambers, a valve for each of said receiving chambers for selectively admitting fluid from the corresponding supply passages, a valve in each of said receiving chambers, means for holding said last-named valves in position to admit fluid from said receiving chambers to said mixing chamber, and means for closing said last-named valves.

12. In a fluid regulating device, a casing, a mixing chamber in said casing, receiving chambers in said casing, passages communicating with said receiving chambers, valves in said passages controlling the admission of fluid into said receiving chambers, valves controlling the passage of the fluid from said receiving chambers to said mixing chamber, manipulative means for opening said last-named valves, and means for closing said last-named valves.

13. In a fluid regulating device, a casing, a mixing chamber in said casing, receiving chambers in said casing, supply passages communicating with said receiving chambers, an independently adjustable valve controlling each of said supply passages, a valve within each of said receiving chambers between said first-named valves and said mixing chamber, means for opening said last-named valves, and automatic means for closing said last-named valves under predetermined conditions.

14. In a fluid regulating device, a mixing chamber, a number of receiving chambers communicating with said mixing chamber, a supply passage opening into each of said receiving chambers, means for selectively admitting fluid from different sources of supply into each of said receiving chambers, valves controlling the admission of fluid from said receiving chambers into said mixing chamber, and means for holding said last-named valves open.

15. In a fluid regulating device, a mixing chamber, a plurality of receiving chambers for supplying fluid to said mixing chamber, a number of supply pipes communicating with each of said chambers, a valve for each of said passages adjustable to admit fluid from either of said supply pipes selectively and at the will of the operator, and independently operable valves controlling the flow of the fluid from said receiving chambers into said mixing chamber.

16. In a fluid regulating device, a mixing chamber, receiving passages, valves for selectively admitting fluid to said receiving passages, and valves controlling the admission of the fluid from said receiving passages to said mixing chamber.

17. In a fluid regulating device, a casing, a mixing chamber in said casing, valves operable to admit fluid to said casing simultaneously from different sources of supply, a valve between each of said first-named valves and said mixing chamber, latch devices for holding said second-named valves open, an actuator under control of the fluid passing from said mixing chamber for releasing said latch devices, and additional actuators for moving said second-named valves to closed position.

18. In a fluid regulating device, a casing, a mixing chamber in said casing, valves operable to admit fluid to said casing from different sources of supply selectively or simultaneously at the will of the operator, a valve between each of said first-named valves and said mixing chamber, manual means for moving said second-named valves to open position to admit fluid into said mixing chamber, latch elements for holding said second-named valves in open position, an actuator for releasing said elements, and means under control of the fluid passing from said mixing chamber for releasing said latch elements, and additional automatic means for closing said second-named valves after said latch elements have been released.

19. In a fluid regulating device, a mixing chamber, receiving chambers, passages from said receiving chambers to said mixing chamber, means for admitting fluid to each of said receiving chambers from different sources of supply selectively and at the will of the operator, valves controlling the flow of the liquid from said receiving chambers to said mixing chamber, manual means for opening said valves, and automatic means for closing said valves after a predetermined amount of liquid has passed through said mixing chamber.

20. In a fluid regulating device, a mixing chamber, a number of receiving chambers, a passage from each of said receiving chambers to said mixing chamber, means for admitting fluid to each of said receiving chambers from different sources of supply selectively and at the will of the operator, a valve for each of said chambers controlling the flow of the fluid therefrom into said mixing chamber, means for opening said valves, means for holding said valves in open position, and automatic means for closing said valves after a predetermined amount has passed through said mixing chamber.

21. In a fluid regulating device, a mixing chamber, oppositely disposed passages opening into the upper end of said mixing chamber whereby fluids from said passages flow together into said mixing chamber, a receiving chamber communicating with each of said passages, means for selectively admitting fluid from different sources of supply into each of said receiving chambers, a valve in each of said receiving chambers, a spring actuating each of said valves toward closed position, means for moving said valves to open position, means for holding said valves in open position, and means for simultaneously releasing said valves.

22. In a fluid regulating device, a mixing chamber, two receiving chambers, means for selectively admitting fluids to each of said receiving chambers from different sources of supply, a puppet valve in each receiving chamber controlling the flow of the fluid therefrom to said mixing chamber, springs within said receiving chambers for holding said valves in closed position, a rod adjacent to each puppet valve, a cam on each rod for moving the corresponding valve to open position when the rod is turned, an element for holding each of said rods in position to maintain the corresponding valve in open position, and electric devices under control of the fluid that has passed through said mixing chamber for releasing said elements to enable said puppet valves to close.

23. In a fluid regulating device, two receiving chambers, a mixing chamber, passages from said receiving chambers into said mixing chamber, elements in said mixing chamber for mixing the fluids passing therethrough, a supply passage opening into each receiving chamber, an independent valve for each receiving chamber controlling the admission of fluid thereinto, a valve in each receiving chamber controlling the flow of fluid into said mixing chamber, manually-operable means for moving said last-named valves to open position, releasable latch elements for holding said last-named valves in open position, an actuator for releasing said latch elements and electric mechanism under control of the fluid that has passed through said mixing chamber for moving said actuator to release said elements to enable said last-named valves to close.

24. In a fluid regulating device, a mixing chamber, two receiving chambers for receiving and delivering fluids into said mixing chamber, a number of passages for delivering fluids of different chemical properties into each of said chambers, valves for selectively admitting fluid from said passages into said chambers, valves controlling the passage of the fluids from said receiving chambers into the mixing chamber, elements for holding said valves open, an actuator for releasing said elements, means for closing said valves when said elements are released, a receptacle for receiving fluid passing from said mixing chamber, and a device under control of the fluid in said receptacle for operating said actuator to release said elements and enable both of said valves to close at the same time.

25. In a fluid regulating device, a mixing chamber, passages for admitting fluid of different kinds into said chamber, valves for selectively admitting fluid of different chemical properties into each of said passages, a receptacle arranged to receive liquid passing from said chamber, a valve in each of said passages, means for moving said valves to open position, a device for holding each of said valves in open position, an actuator for releasing said devices at the same time, means for operating said actuator, means under control of the fluid passing into said rceptacle for causing said operating means to move said actuator when a predetermined quantity of fluid enters said receptacle to release said valves, means for closing said valves, and means for disabling said operating means as an incident to the closing of said valves.

26. A fluid regulating device comprising a mixing chamber, passages opening into said chamber, valves for selectively admitting fluid of different chemical properties into each of said passages, a valve for opening and closing each of said passages, elements for holding said valves open, a member for releasing said elements to enable said valves to close, a device for actuating said member, a receptacle arranged to receive fluid passing from said chamber, means controlled by the fluid in said receptacle for causing said device to operate said member to release said valves when a predetermined quantity of fluids enters said receptacle, and means for moving said valves to closed position as an incident to their release.

27. In a fluid regulating device, a mixing chamber, passages for delivering fluid into said mixing chamber, a valve for admitting fluid of different chemical properties into each of said passages, a valve controlling each of said passages, elements for holding said valves open, a member for releasing said elements, a magnet for actuating said member, a receptacle arranged to receive fluid passing from said chamber, means controlled by the fluid within said receptacle for energizing said magnet and operating said member effectively to release said elements, and means for breaking the energizing circuit of said magnet as an incident to the operation of said member.

28. In a fluid regulating device, the combination with a mixing chamber, separate passages opening into said chamber, a valve controlling the admission of fluid into each of said passages, a puppet valve in each of said passages controlling the flow of the fluid therefrom into said mixing chamber, releasable latch elements for holding said puppet valves in open position to admit fluid into said mixing chamber, and elements in said mixing chamber for causing mixture of the fluids passing therethrough, of an actuator for releasing said latch elements to enable said puppet valves to close, a device for moving said actuator mechanism under control of the fluid that has passed through said mixing chamber for energizing said device and causing the same to move said actuator to release said elements, and additional actuators for moving said puppet valves to closed position when said latch elements are released.

29. The combination with a mixing chamber, elements in said chamber for mixing the fluids passing through said chamber, passages for supplying fluid to said mixing chamber, and valves settable to admit fluids from selected ones of said passages simultaneously, of additional valves controlling the flow of the fluids into said mixing chamber, latch elements for holding said additional valves open, an actuator for releasing said latch elements simultaneously, electric mechanism under control of the fluids that have passed through said mixing chamber for moving said actuators to release said latch elements, and additional means for closing said valves when said latch elements are released.

30. In a fluid regulating device, a number of receiving chambers, a plurality of supply passages communicating with each receiving chamber, a valve for each receiving chamber whereby fluids may be simultaneously admitted into said chambers from selected ones of said supply passages, a mixing chamber arranged to receive the fluids from said receiving chambers, elements in said mixing chamber for mixing the fluids passing therethrough, valves controlling the passage of the fluids from said receiving chambers into said mixing chamber, elements for holding said last-named valves open, and electric mechanism under control of the fluids that have passed said mixing chamber for releasing said holding elements when predetermined quantities of the fluids have passed said mixing chamber.

31. In a fluid regulating device, a mixing chamber, independent passages communicating with said chamber from different sources of supply, elements in said chamber for mixing the fluids flowing through said chamber, a lateral extension for receiving the mixed fluids from said chamber, shelves formed in said extension for causing further mixture of the fluids flowing therethrough, means carried by said extension for indicating visually one of the qualities of the mixture, a discharge passage from said chamber, and means for varying the quantity of fluid entering each of said independent passages to vary the quality of mixture.

32. In a fluid regulating device, a mixing chamber, independent passages communicating with said chamber from different sources of supply and arranged so that the fluid from each of said passages flowing into said mixing chamber will mingle with and increase the flow from any passage having a less degree of pressure whereby the desired quantity of fluid to form the mixture is drawn from each of said passages, passages for admitting fluid of different chemical properties from different sources of supply into each of said first-named passages, and independently manipulative valves controlling said passages.

33. In a fluid regulating device, a mixing chamber, a number of separate passages communicating with said chamber so that fluid from any of said passages mingles with and increases the flow of fluid from any other passage having a less degree of pressure, means for selectively admitting fluid from different sources of supply into each of said passages, and independently settable valves controlling said passages.

34. In a fluid regulating device, a mixing chamber adapted to receive fluids of different qualities, independent passages communicating with said chamber from different sources of supply, means for admitting selected quantities of fluids of different qualities through said passages simultaneously, whereby said fluids are simultaneously discharged into said mixing chamber, means for varying the quantity of fluid entering said chamber through each of said passages to vary the quality of the mixture as desired, spiral vanes in said chamber for mixing the fluids flowing through said chamber, a discharge passage from said chamber, a lateral extension from said chamber between said discharge passage and said independent passages, mixing devices in said extension for mixing the fluids entering said extension, and means in connection with said extension for indicating visually the quality of the mixture so produced.

In witness whereof I have signed this specification in the presence of two subscribing witnesses.

LEWIS A. MAPEL.

Witnesses:
L. C. KINGSLAND,
R. M. LAWRENCE.